United States Patent

[11] 3,627,720

| [72] | Inventors | Ian Geoffrey Hinton<br>Whittlesford;<br>Bernard Peter Stark, Stapleford, both of<br>England |
|---|---|---|
| [21] | Appl. No. | 702,532 |
| [22] | Filed | Feb. 2, 1968 |
| [45] | Patented | Dec. 14, 1971 |
| [73] | Assignee | CIBA Limited<br>Basel, Switzerland |
| [32] | Priority | Feb. 13, 1967 |
| [33] | | Great Britain |
| [31] | | 6,762/67 |

[54] EPOXIDE-CONTAINING COMPOSITIONS
16 Claims, No Drawings

[52] U.S. Cl. ..................................... 260/29.3,
204/181, 260/18, 260/29.2, 260/29.4, 260/29.6,
260/47, 260/75, 260/78.4, 260/831, 260/834,
260/837

[51] Int. Cl. ..................................... C08g 51/24,
C23b 13/00

[50] Field of Search ..................................... 260/47 EP,
29.2 EP, 2 EP, 78.4 EP, 29.3

[56] References Cited
UNITED STATES PATENTS

| 2,324,483 | 7/1943 | Castan.................... | 260/47 |
| 2,698,308 | 12/1954 | Crecelius................... | 260/47 |
| 3,025,263 | 3/1962 | Lee et al.................. | 260/47 |
| 3,052,650 | 9/1962 | Wear et al................. | 260/47 |
| 3,272,843 | 9/1966 | Spatz et al................ | 260/47 |
| 3,336,253 | 8/1967 | Wong et al................ | 260/29.2 |
| 3,449,281 | 6/1969 | Sullivan et al............. | 260/29.2 |
| 2,752,269 | 6/1956 | Condo et al............... | 260/2 |
| 2,970,983 | 2/1961 | Newey..................... | 260/78.4 |
| 3,062,770 | 11/1962 | Hirsch et al............... | 260/29.2 |
| 3,355,401 | 11/1967 | Tanner..................... | 260/29.2 |

OTHER REFERENCES

Lee et al. (text) " Handbook," 1967, pages 5- 20 to 5- 25 are cited

*Primary Examiner*—Julius Frome
*Assistant Examiner*—Arthur H. Koeckert
*Attorneys*—Harry Goldsmith, Joseph G. Kolodny and Bryant W. Brennan

ABSTRACT: Curable compositions comprising:

a. a material formed by heating a liquid mixture of a polycarboxylic acid anhydride with an epoxide alcohol free from carboxyl groups, so that at least 40 percent of the alcoholic hydroxyl group content of the epoxide alcohol is esterified by the polycarboxylic acid anhydride but not more than 25 percent of the 1,2-epoxide group content of the epoxide alcohol has reacted with the polycarboxylic acid anhydride, b. a base in quantity sufficient to neutralize at least some of component (a), and, if required, c. a curing agent for component (a).

EPOXIDE-CONTAINING COMPOSITIONS

This invention relates to curable epoxide-containing compositions, and to hardened products obtained by pouring such compositions.

Electropainting, otherwise known as electrophoretic deposition, is fast becoming established as a means of coating metallic articles on a large scale, an example being the application of primer paints to car bodies. The article to be coated is suspended in a tank containing the paint which is a heat-curable, water-based, resinous colloidal electrolyte or resinous dispersion stabilize by a colloidal electrolyte. The article serves as one electrode, usually the anode, the tank, and/or one or more conductive articles of suitable dimensions suspended in the tank, being the other electrode. On passage of an electric current, the resin, and hardener and suspended pigment if present, are transported electrophoretically to the article to be coated, and are deposited thereon, primarily by discharge of the colloidal particles of the resin, although it is possible that dissolved ions of the metal article to be coated (the anode) also cause precipitation of the resinous particles. The water is forced away from the coating, probably by an electrolytic effect, although some at least of the water may be removed by electro-osmosis. The article is removed from the bath, rinsed and then baked to cure the coating.

It is known that epoxide resins, i.e. substances containing more than one 1,2-epoxide group per average molecule, can be cross linked by means of hardening agents, such as dicarboxylic acid anhydrides, which are at least difunctional with respect to the 1,2-epoxide groups, to form cured products of valuable technical properties and which may be used, inter alia, as surface coatings. Catalytic hardeners may also be used, such as monotertiary amines, which induce polymerization through the epoxide groups. It is also known that substances containing only one 1,2-epoxide group per molecule can be cross linked by hardening agents which are at least trifunctional with respect to the 1,2-epoxide group.

While water-soluble and water-dispersible epoxides are known, these do not in general contain ionic groups which would permit their electrophoretic transfer and deposition upon metal substrates.

It has recently been proposed in British Pat. No. 1,080,172 to prepare a water-thinnable coating composition by reaction, to form a condensation polymer, between a glycidyl polyether of a dihydric phenol and acids consisting essentially of a. one or more monobasic aliphatic carboxylic acids derived from fats or oils or resin, and b. one or more aliphatic or alicyclic polybasic acids containing in the molecule at least two carboxyl groups of which at least one is attached to a polymethylene group containing at least four carbon atoms, or the anhydride of such a fatty acid, such that the individual proportions of (a) and of (b) do not exceed the chemical equivalent of the glycidyl polyether, and adding to the polymer so obtained an amphipathic solvent and a neutralizing agent in an amount substantially sufficient to neutralize the acid groups in the polymer.

In this process, which is applied only to a certain class of polyepoxide, the glycidyl polyether reacts with the acids to give polymeric materials which are substantially free from epoxide groups. In a first stage, the epoxide ring is opened and a secondary alcoholic hydroxyl group is formed. As is shown later, the glycidyl polyether as originally employed may contain secondary alcoholic hydroxyl groups. On heating, reaction may occur between epoxide groups and the secondary alcoholic hydroxyl groups and also carboxyl-containing intermediates, produced by action of the dicarboxylic acid upon an epoxide group-containing material. In this manner, long-chain polymers are formed, but only at the expense of the epoxide groups: the products have few, if any, epoxide groups.

These polymers can be electrodeposited, and can be hardened or cured, i.e. converted into insoluble, cross linked structures, by heating. Curing apparently involves interreaction of polymeric molecules through their hydroxyl groups and also, since unsaturated acids or anhydrides are usually employed, by air-drying.

Van Westrenen, Weber, Smith and May (Proceedings 8th FATIPEC Congress, 1966, pp. 126–136) have recently described a similar process in which a polyglycidyl ether of a polyhydric phenol (which may, as will be shown later, contain secondary alcoholic hydroxyl groups) is heated with either an unsaturated fatty acid and then with maleic anhydride, or with a fatty acid (which need not be unsaturated) and then with phthalic anhydride. These products, too, may be dissolved or dispersed in water in the presence of a base and an amphipathic solvent, and coatings deposited from the solutions or dispersions by electrophoresis. The polymeric products are formed in a similar manner to those described in British Pat. No. 1,080,172, i.e. epoxide groups are consumed; they cure in a similar manner. These products likewise contain very few epoxide groups.

It has now been found that epoxide alcohols may be reacted with polycarboxylic acid anhydrides to introduce, by esterification of the alcoholic hydroxyl groups, free carboxyl groups, without substantial destruction of the epoxide content, and that the carboxyl group-containing products may be treated with bases to form hardenable, water-soluble or water-dispersible products.

The present invention accordingly provides curable compositions comprising:

a. a material formed by heating a liquid mixture of a polycarboxylic acid anhydride with an epoxide alcohol free from carboxyl groups, so that at least 40 percent of the alcoholic hydroxyl group content of the epoxide alcohol is esterified by the polycarboxylic acid anhydride but not more than 25 percent of the 1,2-epoxide group content of the epoxide alcohol has reacted with the polycarboxylic acid anhydride, b. a base in quantity sufficient to neutralize at least some of the free carboxyl groups of component (a), and, if required, c. a curing agent for component (a). Preferably, such curable compositions further contain:

d. water, and e. a substance rendering component (a), neutralized by (b), soluble in water. Products obtained by curing these curable compositions are within the scope of the invention.

Component (a) is suitably obtained by heating the epoxide alcohol with the polycarboxylic acid anhydride, preferably in the absence of any added solvent, at a temperature in the range 60° to 150° C., and preferably at 80° to 130° C., for a period of at least 30 minutes, preferably from 1 to 3 hours. If desired however, a solvent that is inert to epoxide groups may be added, e.g. a ketonic solvent such as ethyl methyl ketone, isobutyl methyl ketone, sec.-butyl methyl ketone, phorone, isophorone, cyclohexanone or methylcyclohexanone. The anhydride is used in a quantity sufficient to supply from 0.4 up to a preferred maximum of 1.3 anhydride group equivalents per hydroxyl group equivalent of the epoxide alcohol.

The epoxide alcohol used to prepare component (a), unlike those the use of which is described in British Pat. No. 1,080,172 and in the FATIPEC article, need not be an esterified resin; in fact, it is preferred to employ an epoxide alcohol which is free from esterified carboxyl groups. Preferably it has a 1,2-epoxide content of at least 1.0 equivalent per kilogram; preferably also it contains no substituent groups, apart from 1,2-epoxide groups and alcoholic hydroxyl groups, capable of reaction with the polycarboxylic acid anhydride. The polycarboxylic acid anhydride is preferably a dicarboxylic acid anhydride: likewise, the polycarboxylic acid anhydride preferably contains no substituent groups, other than polycarboxylic acid anhydride groups, capable of reaction with the 1,2-epoxide groups or alcoholic hydroxyl groups of the epoxide alcohol.

The alcoholic hydroxyl groups of the epoxide alcohol used to prepare component (a) are preferably primary or secondary.

The epoxide alcohol used may contain one 1,2-epoxide group per molecule, and may be, e.g., glycidol, or a compound of the formula:

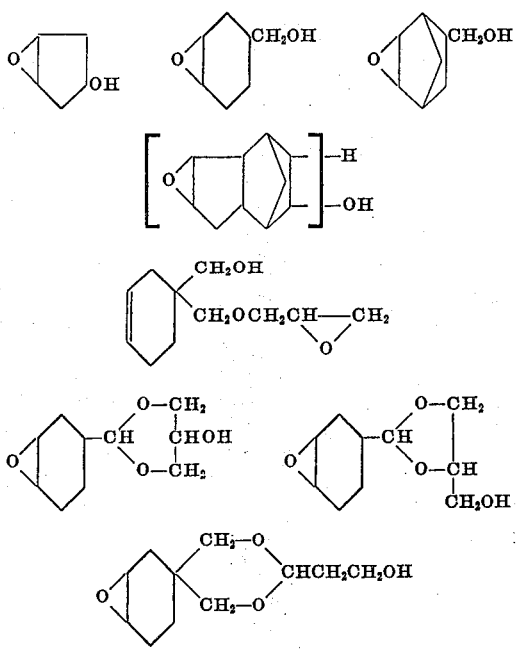

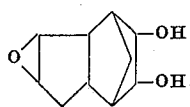

or

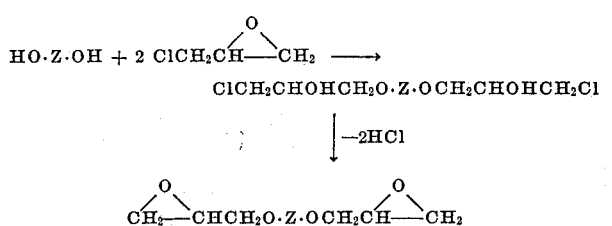

Such monoepoxy cycloaliphatic alcohols may be obtained by epoxidation in known manner, e.g. with peracetic acid, of the corresponding monounsaturated cycloaliphatic alcohol. Epoxycycloaliphatic alcohols may also be obtained on epoxidation of cycloaliphatic compounds having two or more ethylenic double bonds but free from alcoholic hydroxyl groups, the hydroxyl groups being formed through solvolysis during epoxidation with a peracid.

Preferably, however, the epoxide alcohol contains, per average molecule, more than one 1,2-epoxide group, i.e. the epoxide alcohol is an alcoholic hydroxyl group-containing epoxide resin.

Those epoxy resins which are the most widely used commercially are those obtained by reaction of a compound having two or more phenolic hydroxyl groups with epichlorohydrin or glycerol dichlorohydrin either under alkaline conditions, or under acid conditions or in the presence of a catalyst followed by treatment with alkali. For example, the reaction of a dihydric phenol HO.Z.OH with epichlorohydrin in the presence of alkali may be represented as follows:

$$HO \cdot Z \cdot OH + 2\ ClCH_2CH\underset{O}{\underbrace{\phantom{--}}}CH_2 \longrightarrow$$

$$ClCH_2CHOHCH_2O \cdot Z \cdot OCH_2CHOHCH_2Cl$$

$$\downarrow -2HCl$$

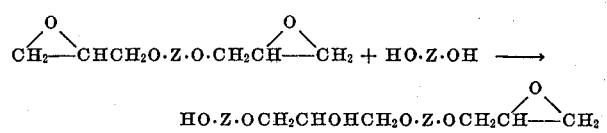

This diglycidyl ether may, however, react with a further molecule of the dihydric phenol, thus:

$$CH_2\underset{O}{\underbrace{\phantom{--}}}CHCH_2O \cdot Z \cdot O \cdot CH_2CH\underset{O}{\underbrace{\phantom{--}}}CH_2 + HO \cdot Z \cdot OH \longrightarrow$$

$$HO \cdot Z \cdot OCH_2CHOHCH_2O \cdot Z \cdot OCH_2CH\underset{O}{\underbrace{\phantom{--}}}CH_2$$

and the terminal phenolic group so introduced may react with a further molecule of epichlorohydrin, and the product then undergo dehydrohalogenation as before. Alternatively, one molecule of the dihydric phenol may react with two molecules of the diglycidyl ether. The final product may be represented by the average formula

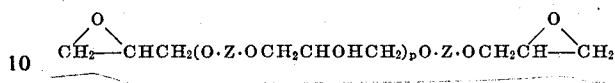

where p is a whole or fractional number. By suitable adjustment of the reaction conditions in a known manner, products may be obtained containing on average at least one alcoholic hydroxyl group per molecule.

Phenols containing two or more phenolic hydroxyl groups which may be so reacted to give hydroxyl-containing epoxy resins are, for example, resorcinol, catechol, hydroquinone, 1,4-dihydroxynaphthalene, 1,5-dihydroxynaphthalene, bis(4-hydroxyphenyl)methane, bis(4-hydroxyphenyl)-methylphenylmethane, bis(4-hydroxyphenyl)tolylmethanes, 4,4'-dihydroxy-diphenyl, bis(4-hydroxyphenyl)sulphone, 2,2-bis(4-hydroxyphenyl)propane (Bisphenol A), and phenol-formaldehyde novolac resins.

Compounds containing two alcoholic hydroxyl groups may similarly be reacted, e.g. ethylene glycol and polyethylene glycols, propylene glycol and polypropylene glycols, propane-1,3-diol, butane-1,4-diol, pentane-1,5-diol, hexane-1,6-diol, and N-aryldialkanolamines such as N-phenyldiethanolamines, though with such compounds it is not so easy as with dihydric phenols to proceed beyond the product formed by reaction of one molecule of dihydric alcohol with two molecules of epichlorohydrin. Compounds containing three or more alcoholic hydroxyl groups may also be used, e.g. glycerol, 3-hydroxymethylpentane-2,4-diol, hexane-2,4,6-triol, 1,1,1-trimethylolpropane and pentaerythritol, when the epoxy alcohol may be produced by incomplete etherification with epichlorohydrin.

Apart from the foregoing compounds, which are polyglycidyl ethers, epoxy resins may be used in which at least one of the epoxide groups is directly attached to a cycloaliphatic nucleus, such as 3,4-epoxy-1-glycidoxymethyl-1-hydroxymethylcyclohexane.

Preferred epoxide alcohols are those of the formula:

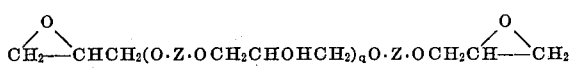

where Z denotes the group of formula

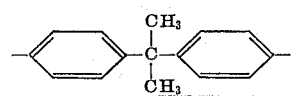

and $q$ is a number having a value of at least one but not more than 10.

Anhydrides of dicarboxylic acids which may be used to react with the epoxy alcohol to form component (a) include tetrahydrophthalic anhydride, hexahydrophthalic anhydride, methylendomethylenetetrahydrophthalic anhydride, hexachloroendomethylenetetrahydrophthalic anhydride, methyltetrahydrophthalic anhydride, nonenylsuccinic anhydride, dodecenylsuccinic anhydride, polysebacic anhydride and polyazelaic anhydride. Tetrahydrophthalic anhydride and hexahydrophthalic anhydride are preferred.

The base (b) is preferably used in a quantity at least sufficient to neutralize the free carboxyl groups of component (a).

As examples of bases which may be used to neutralize the carboxyl groups there may be mentioned: ammonia, alkali metal hydroxides, and amines, including aminoalcohols such as ethanolamine and triethanolamine. Preferred bases are aqueous solutions of ammonia or sodium or potassium hydroxides. Neutralization should be effected in such a manner that the residual 1,2-epoxide content of component (a) does not react with the base to such an extent that gelling or substantial cross linking of component (a) occurs. Conveniently, neutralization is carried out at about 15°–25° C. The neutralized products typically have a useful life of some weeks at ordinary storage temperatures before gelation takes place.

As the substance (e), the amphipathic solvent, rendering the neutralized component (a) soluble in water, there may be used a volatile liquid aliphatic alcohol containing less than 10 carbon atoms, such as n-propanol, isopropanol, n-butanol, isobutanol or sec.-butanol, and it is preferred to employ a volatile liquid aliphatic monoether of an alkylene glycol or of a dialkylene glycol, especially a monoether of ethylene glycol with an alkanol containing from one to four carbon atoms: 2-n-butoxyethanol is particularly suitable.

In some cases, the neutralized modified resin may be cross linked, i.e. rendered insoluble and infusible, by the agency of heat alone, through the reaction of the residual epoxide groups with the carboxyl ions. If desired, a catalyst for this reaction, such as an alkali metal hydroxide, may be included. In other cases, a cross linking agent may be necessary. Examples of such agents include polyamines such as ethylenediamine, diethylenetriamine, triethylenetetramine, tetraethylenepentamine, propane-1,2-diamine, propane-1,3-diamine, N,N'-diethylethylenediamine, N,N-dimethylpropane-1,3-diamine, bis(N-2-hydroxyethyl)diethylenetriamine, isophoronediamine (1-amino-3-aminomethyl-3,5,5-trimethylcyclohexane), 1,6-diamino-2,2,4-and 2,4,4-trimethylhexanes, bis(4-aminocyclohexyl)methane, 2,2-bis(4-aminocyclohexyl)propane, bis(4-aminophenyl)methane, aniline-formaldehyde resins, and poly(aminoamides) such as those prepared from aliphatic polyamines and dimerized or trimerized unsaturated fatty acids. There may also be used polycarboxylic acids and their anhydrides, such as phthalic acid, tetrahydrophthalic acid, hexahydrophthalic acid, isophthalic acid, terephthalic acid, adipic acid, maleic acid, citric acid, pyromellitic acid, phthalic anhydride, methylendomethylenetetrahydrophthalic anhydride, nonenylsuccinic anhydride, dodeoenylsuccinic anhydride, hexahydrophthalic anhydride, hexachloroendomethylenetetrahydrophthalic anhydride and endomethylenetetrahydrophthalic anhydride, and their mixtures, maleic anhydride, succinic anhydride, polysebacic anhydride, polyazelaic anhydride, pyromellitic dianhydride and benzophenone-3,3′,4,4′-tetra-carboxylic acid dianhydride. The preferred curing agents are those capable of reacting both with 1,2-epoxide groups and with alcoholic hydroxyl groups, in particular melamine-formaldehyde or urea-formaldehyde resins, which may be etherified with an aliphatic alcohol containing from one to four carbon atoms, phenol-formaldehyde resins, and also acrylate resins containing free carboxyl groups.

When component (a) has been prepared from a mono-1,2-epoxide alcohol, the curing agent should be at least trifunctional. Examples of suitable such curing agents are pyromellitic dianhydride, urea-formaldehyde or melamine-formaldehyde resins, which may be etherified as aforesaid, and phenol-formaldehyde resins.

The compositions of the present invention may also contain pigments, fillers, plasticizers dispersing agents and liquid mono- or polyepoxides.

The compositions may be used as adhesives, or as resins in the treatment of paper and textiles, and for fixing dyestuffs. They are particularly suitable as surface coatings, and may be applied by brushing, roller-coating, dipping, spraying or electrophoretic deposition.

The following examples illustrate the invention. Unless otherwise indicated, epoxide contents were determined by titration with hydrogen bromide in glacial acetic acid, (see Durbetaki, Analytical Chemistry, 1956, 28, 2,000) and softening points were determined by the ball and ring method. Parts are by weight.

EXAMPLES 1–20

The epoxide resin employed, hereinafter termed "Epoxy resin A," was a polyglycidyl ether of Bisphenol A and had the average formula

where X denotes

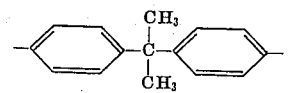

and $r$ is approximately 3.4; it had an epoxide content of 2.0 equiv./kg. and a melting point range of 64°–76° C. Portions of Epoxy resin A (each of 250 g.) were stirred and heated with the anhydrides indicated in table I on an oil bath at 120° C. A 10 g. sample of each modified resin was dissolved in 10 g. of 2-n-butoxyethanol, and distilled water was added until the resin began to separate from solution. Sufficient aqueous ammonia (specific gravity 0.88) was then added to dissolve the precipitate, more distilled water was added, and additions of the aqueous ammonia solution and distilled water were repeated until the precipitated resin would no longer redissolve on adding ammonia solution.

Table I shows the conditions employed in making the modified resins, the last two columns indicating the volume of distilled water that could be tolerated by the modified resin and the volume of the aqueous ammonia solution required to give a clear solution.

It will be seen that at least 80 percent of the epoxide content of the resin was retained on reaction with the anhydride. That reaction, i.e. esterification, had occurred, could be shown by determining the carboxyl group-content of the modified resin.

TABLE I

| Example No. | Anhydride | | | Period of heating (hrs.) | Epoxide content of modified resin | | Softening point of modified resin (° C.) | Volume of distilled water tolerated (ml.) | Volume of aqueous ammonia required (ml.) |
|---|---|---|---|---|---|---|---|---|---|
| | Name | Weight (g.) | Equiv. calculated on OH-content | | Equiv./kg. | Proportion retained (percent) | | | |
| 1 | Hexahydrophthalic | 150 | 1.2 | 1 | 1.23 | 98 | 72 | 42 | 5.5 |
| 2 | do | 150 | 1.2 | 2 | 1.1 | 89 | 87 | 200 | 4.5 |
| 3 | do | 125 | 1.0 | 1 | 1.3 | 96 | 82 | 25 | 5 |
| 4 | do | 125 | 1.0 | 2 | 1.1 | 83 | 97 | >250 | 3 |
| 5 | do | 100 | 0.8 | 1 | 1.3 | 93 | 89 | 12 | 5 |
| 6 | do | 100 | 0.8 | 2 | 1.2 | 83 | 100 | >250 | 3 |
| 7 | do | 75 | 0.6 | 1 | 1.4 | 93 | 89 | 10 | 5 |
| 8 | do | 75 | 0.6 | 2 | 1.3 | 83 | 100 | >250 | 2 |
| 9 | do | 50 | 0.4 | 1 | 1.6 | 95 | | 5 | 5 |
| 10 | do | 50 | 0.4 | 2 | 1.4 | 86 | | >250 | 3 |
| 11 | do | 25 | 0.2 | 1 | 1.7 | 98 | | 5 | 2 |
| 12 | do | 25 | 0.2 | 2¼ | 1.7 | 98 | | 6 | 2 |
| 13 | Dodecenylsuccinic | 200 | 0.9 | 1 | 1.1 | 100 | <20 | 3 | 3 |
| 14 | do | 200 | 0.9 | 2 | 1.1 | 100 | <20 | 5 | 3 |
| 15 | do | 200 | 0.9 | 3 | 1.1 | 100 | <20 | 12 | 2 |
| 16 | Tetrahydrophthalic | 120 | 0.9 | 1 | 1.3 | 98 | *52 | 11 | 3 |
| 17 | do | 120 | 0.9 | 2 | 1.1 | 83 | *72 | 100 | 2 |
| 18 | Methyltetrahydrophthalic | 120 | 0.85 | 2 | 1.2 | 90 | *54 | 10 | 2 |
| 19 | Nonenylsuccinic | 160 | 0.85 | 1 | 1.2 | 98 | <20 | 8 | 2 |
| 20 | do | 160 | 0.85 | 2 | 1.2 | 98 | <20 | 35 | 2 |

* Softening point determined by Kofler method.

Thus, a 10 g. sample of the modified resin prepared as indicated in example 5 was dissolved in 25 ml. of acetone at room temperature and titrated against 1-N aqueous sodium hydroxide solution with phenolphthalein as indicator.

The epoxide resin-anhydride mixture before reaction contained 1.4 epoxide equivalents per kg. After heating for 1 hour, the epoxide content had decreased, as shown in table I, to 1.3 equiv./kg. Since each epoxide group removed does so by reaction with an anhydride group with formation of one carboxyl group, this reduction causes a fall in the carboxyl group content of (1.4−1.3), i.e. 0.1 equiv./kg. The original mixture had an anhydride content of 1.9 equiv./kg. Since one mole of anhydride reacts with two moles of sodium hydroxide, the corresponding carboxyl group content is 2×1.9, i.e. 3.8 equiv./kg. Hence, if the only reaction which had occurred was the opening of the epoxide ring with the anhydride, neutralization with sodium hydroxide would indicate a carboxyl content of (3.8−0.1), i.e. 3.7 equiv./kg. But the titration indicated a carboxyl group content of 2.5 equiv./kg. The content of esterified carboxyl groups is therefore (3.7−2.5), i.e. 1.2 equiv./kg. From this, it follows that the degree of conversion of the original anhydride groups into ester groups by reaction with the hydroxyl groups in the epoxide resin is 1.2/1.9×100 percent, i.e. 64 percent.

A sample of the modified resin, prepared as indicated in example 6, was similarly titrated. This resin was similar to that of example 5, but the reaction time was, as indicated in table I, 2 hours. The decrease in epoxide content is (1.4−1.2), i.e. 0.2 equiv./kg. Hence, if opening of the epoxide ring by means of the anhydride was the only reaction occurring, the expected free carboxyl group content would be (3.8−0.2), i.e. 3.6 equiv./kg. The content, as determined by titration, is 1.9 equiv./kg., so the content of esterified carboxyl groups is (3.6−1.9), i.e. 1.7 equiv./kg. The degree of conversion is therefore 1.7/1.9×100 percent, i.e. 90 percent.

EXAMPLES 21–24

These examples illustrate the stability on storage at various temperatures of the neutralized modified resins.

The modified resin used, ("Modified resin I"), was prepared by heating 100 g. of hexahydrophthalic anhydride with 250 g. of Epoxy resin B for 2 hours. (Epoxy resin B was similar to Epoxy resin A but had a slightly higher epoxide content). Samples of Modified resin I were stored at various temperatures and the change in epoxide content and softening point were noted. The results obtained are shown in table II.

TABLE II

| Storage Conditions | Epoxide content (equiv./kg.) | Softening point (Kofler) |
| --- | --- | --- |
| Initial value | 1.4 | 70° C. |
| 20° c./14 days | 1.4 | 70° C. |
| 40° C./7 days | 1.4 | 76° C. |
| 60° C./7 days | 1.1 | 92° C. |
| 80° C./2 days | 0.7 | 108° C. |
| 100° C./4 days | 1.4 | 85° C. |

Other samples of Modified resin I were diluted with an equal weight of 2-n-butoxyethanol, and stored at various temperatures. Changes in epoxide content and carboxylic acid content of the mixtures are shown in table III.

Table III

| Storage Conditions | Epoxide content (equiv./kg.) | Carboxyl content (equiv./kg.) |
| --- | --- | --- |
| Initial value | 0.65 | 0.97 |
| 20° C./10 days | 0.65 | 0.97 |
| 40° C./10 days | 0.65 | 0.97 |
| 60° C./10 days | 0.35 | 0.93 |
| 80° C./2 days | 0.20 | |
| 120° C./2 days | 0.20 | |

Portions, each of 10 g. of Modified resin II (prepared by heating 100 g. of hexahydrophthalic anhydride with 250 g. of Epoxy resin A for 2 hours at 120° C.), were mixed with 10 g. of 2-n-butoxyethanol, and treated with a base as follows:

Example 21: diluted with a mixture of 1.5 ml. aqueous ammonia (S.G. 0.88) and 78.5 ml. of distilled water;
Example 22: adjusted to neutrality with 1 N-sodium hydroxide solution (using phenolphthalein as indicator) and diluted to 100 ml. with distilled water;
Example 23: adjusted to neutrality with triethanolamine (using bromothymol blue as indicator) and diluted to 100 ml. with distilled water;
Example 24: adjusted to neutrality with ethanolamine (using bromothymol blue as indicator) and diluted to 100 ml. with distilled water.

The useful lives of the diluted and neutralized modified resin solutions, i.e. the interval before gelation or precipitation occurred, are shown in table IV.

TABLE IV

| Example No. | Storage at 20° C. | 40° C. | 60° C. |
| --- | --- | --- | --- |
| 21 | >14 days | >14 days | 2–3 days |
| 22 | >14 days | >14 days | 8 days |
| 23 | 10 days | 4 days | 1 day |
| 24 | 10 days | 4 days | 1 day |

EXAMPLE 25

A mixture of Epoxy resin A (1,000 g.) and tetrahydrophthalic anhydride (400 g., 0.75 equiv. calculated on the hydroxyl content) was heated for 2 hours at 130° C., followed by heating at 120° C. for various lengths of time. Samples, each of 10 g., of the products were mixed with 10 g. of 2-n-butoxyethanol, diluted to 10 percent solids content with a mixture of aqueous ammonia (S.G. 0.88, 1.5 parts by volume) and distilled water (78.5 parts by volume), and kept at 40° C.

The results obtained are shown in table V.

TABLE V

| | Epoxide content (equiv./kg.) | Carboxyl content (equiv./kg.) | Softening point, Kofler (°C.) | Initial appearance of solution | Stability of solution at 40° C. (days) |
| --- | --- | --- | --- | --- | --- |
| After 2 hours/130° C | 1.3 | 1.9 | 70 | Slightly opalescent | >10 |
| Plus 1 hour/120° C | 1.1 | 1.8 | 79 | Clear | >10 |
| Plus 2 hours/120° C | 1.0 | 1.8 | 80 | ...do... | >10 |
| Plus 3 hours/120° C | | | 90 | Resin gelled | |

EXAMPLE 26

Epoxy resin A (1 kg.) and hexahydrophthalic anhydride (400 g., 0.75 equiv. calculated on the hydroxyl content) were mixed at 130° C. and heated with stirring at this temperature for 2 hours. To the product was added 2-n-butoxyethanol (1,400 g.,) and the solution ("Modified resin III") was cooled to 20° C.

Samples of Modified resin III were diluted with an equal weight of either 2.5 percent aqueous ammonia solution or 1 N-aqueous sodium hydroxide solution, and stored at 20 ° C. The changes in epoxide content of the products are shown in table VI. It will be seen that the epoxide content decreased quite slowly.

TABLE VI

| Time elapsed after preparing solution | Epoxide content (equiv.kg.) | |
|---|---|---|
| | Aqueous ammonia | Aqueous sodium hydroxide |
| 1 min. | 0.32 | 0.29 |
| 1 hour | 0.32 | 0.29 |
| 2 hours | 0.31 | |
| 3 hours | 0.30 | |
| 4 hours | 0.29 | |
| 24 hours | 0.11 | 0.26 |
| 48 hours | | 0.18 |

A mixture of 100 parts of Modified resin III, 110 parts of ammonia solution (prepared by diluting one volume of ammonia solution, S.G.O.88, with nine volumes of distilled water) and 100 parts of distilled water had not gelled after storing at room temperature for 5 months.

EXAMPLE 27

The epoxyalcohol used had the formula

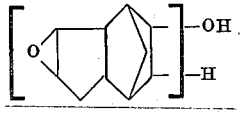

and was prepared in known manner by epoxidation with peracetic acid of dihydrodicyclopentadienol.

This monoepoxide (250 g.) and hexahydrophthalic anhydride (190 g.) were heated together at 120° C. After being heated for 2.75 hours, the mixture had an epoxide content of 2.5 equiv./kg. and a carboxyl content of 2.3 equiv./kg.; the calculated values, assuming no reaction to have occurred, are 3.2 and 5.6 equiv./kg. respectively. A 10 g. sample of the product formed a clear solution in a mixture of 10 g. 2-n-butoxyethanol, 1.5 ml. aqueous ammonia (S.G. 0.88), and 78 ml. of distilled water.

EXAMPLE 28

A mixture of 20 g. of Modified resin III and 0.5 g. of 25 percent aqueous trimethylamine was spread on aluminum sheets and baked for 1 hour at 100° C. Hard, flexible films, resistant to acetone, were obtained.

A 20 g. sample of Modified resin III was mixed with 4 g. of 25 percent aqueous trimethylamine and 0.2 to 1 g. of triethylenetetramine. This mixture could be diluted with up to 60 ml. of water without precipitating the modified resin. The undiluted mixture was applied to aluminum sheets; on curing at 20° C. for 2 weeks, hard, clear coatings, resistant to acetone, were obtained.

For purposes of comparison, two resins were prepared, the first ("Esterified resin IV") following the method described in British Pat. No. 1,080,172, and the second, ("Esterified resin V"), as described by van Westrenen et al. in their FATIPEC Congress paper referred to above.

Esterified resin IV

Epoxy resin A (950 parts), linseed oil fatty acids (1,050 parts) and sodium carbonate decahydrate (0.15 part) were heated at 220° C. in an atmosphere of nitrogen, xylene being dripped in to remove the water formed as an azeotrope. When the acid value dropped to just below 10 mg. KOH per gram, the mixture was cooled to not more than 140° C., "Admerginate acid L.P" (433 parts) was added, and heating was continued for 6 hours at 140° C. The acid value dropped to 53 mg. KOH per gram after 2 hours, and remained at that value during the rest of the period of heating.

"Admerginate acid L.P." is supplied by J. Bibby and Sons, Limited, Liverpool, England, and is believed to have the formula

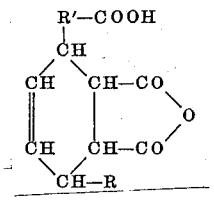

where R denotes a pentyl or hexylgroup and R' denotes a polymethylene chain having eight or seven carbon atoms.

An aliquot of the esterified resin was examined for the presence of 1,2-epoxide groups by titration with perchloric acid in acetic acid in the presence of excess tetraethylammonium bromide using crystal violet as indicator (Jay, Analytical Chemistry, 1964, 36, 667): the epoxide content was found to be negligible, i.e., less than 0.01 equiv./kg.

Esterified resin V

Epoxy resin A (190 parts) was added over 10 minutes to linseed oil fatty acids (142 parts) containing 0.08 part of sodium carbonate decahydrate heated to 120° C. in an atmosphere of nitrogen. The temperature was raised to 160° C. and xylene was added as in the preparation of Esterified resin IV. The temperature was next increased to 220° C. and held there until the acid value was 8-10. Then the mixture was cooled to 130° C., and the calculated amount of phthalic anhydride required to achieve a final acid value of 50 mg. KOH per kg., i.e. 42 parts, was added. Heating was continued at 140° C. for 6 hours. The epoxide content of the product, as determined by Jay's method, was only 0.023 equiv./kg.

A film comprising 100 parts of Modified resin III and 2.75 parts of triethylenetetramine was applied to glass, and left at room temperature for 7 days. That curing had taken place was shown by the resistance of the film in the acetone rub test. Similar results were obtained if the composition were diluted with 190 parts of water plus 10 parts of aqueous ammonia, S.G. 0.88, before application to glass.

Films of mixtures comprising 100 parts of Esterified resin IV or Esterified resin V and 2.75 parts by weight of triethylenetetramine were likewise applied to glass and kept at room temperature. Despite prolonged storage, no curing of the films occurred.

That the mixture of Modified resin III and Maine cured at room temperature, while mixtures of an amine and Esterified resins IV and V did not, demonstrates unequivocally that only the composition of the present invention contained sufficient epoxide groups to cure through these groups.

A further 20 g. sample of Modified resin III was mixed with 2 ml. of aqueous ammonia solution (S.G. 0.88) and 3 g. of a methoxymethylmelamine resin ("Melamine resin VI") containing approximately 3.5 methoxymethyl groups and approximately 2.1 free methylol groups per molecule. This mixture could be diluted with up to 80 ml. water, forming an opalescent solution. The undiluted mixture was applied to aluminum sheets; on pouring at 190° C. for 2 hours, flexible coatings were obtained which did not soften on immersion in acetone for 1 hour. Incorporation of toluene-p-sulphonic acid (0.2 g.) in the mixture did not affect the water solubility but accelerated the rate of cure and improved the hardness of the coatings.

Two mixtures were prepared, containing 100 parts of Modified resin III, 100 parts of aqueous ammonia solution (prepared by diluting one volume of aqueous ammonia solution, S.G. 0.88, with nine volumes of distilled water), 18 or 20 parts of a 70 percent w/w aqueous solution of a methoxymethylmelamine resin ("Melamine resin VII") containing approximately 4.4 methoxymethyl groups and approximately 1.6 free methylol groups per molecule, and 100 parts of distilled water. The mixtures were clear when first prepared, but turned cloudy after five minutes. This cloudiness was removed by adding 10 parts of the diluted aqueous ammonia solution.

These mixtures were sprayed onto aluminum panels 0.315 mm. thick, and the coated panels were stored at 150° C. for 30 minutes (see British Ministry of Defense Specification DEF 1053). The hardened films had good resistance to acetone, and were flexible, i.e. the panels could be bent around a mandrel of diameter 3.2 mm. without the film cracking.

Pigmented films could be prepared from these mixtures by incorporating 50 percent by weight of titanium dioxide (such as that available from British Titan Products Co. Ltd. under the designation "Tioxide R—CR—3"). The optimum curing conditions for such pigmented films were 140° C. for 20 minutes.

EXAMPLE 29

A water-soluble acrylate resin, hereinafter known as "Acrylate resin VIII," was prepared by heating 140 g. of acrylic acid, 360 g. butyl acrylate, 500 g. styrene, 1 kg. of n-butanol and 15 g. of dodecyl mercaptan at 120° C. for 10 hours under reflux while cumene hydroperoxide (30 g.) was added portionwise, cooling the mixture to 25° C. and adding 100 ml. of aqueous ammonia (S.G. 0.88).

Modified resin III and Acrylate resin VIII were mixed in the proportions indicated below, spread on aluminum sheets, and cured at 190° C. Table VII shows the properties of the cured films.

Solution A
  Modified resin III ... 40 g.
  aqueous ammonia (S.G. 0.88) ... 3 ml.
  distilled water ... 157 ml.
Solution B
  Acrylate resin VIII ... 40 g.
  2-n-butoxyethanol ... 20 g.
  distilled water ... 140 ml.
Solution C
  solution A ... 100 g.
  solution B ... 100 g.

Properties of the coatings obtained on the anodes are shown in table VIII.

TABLE VIII

| Electrodeposition from | Rinsed coating before stoving | Rinsed coating after stoving |
| --- | --- | --- |
| Solution A | opaque, hard | flexible, softened by acetone |
| Solution B | soft, sticky | brittle, soluble in acetone |
| Solution C | opaque, soft | flexible, slightly softened by acetone |

EXAMPLE 31

The solutions used were:

Solution D
  Modified resin III ... 100 parts
  dilute aqueous ammonia, (one volume aqueous ammonia, S.G. 0.88 to nine volumes distilled water) ... 100 parts
  Melamine resin VII ... 18 parts
  distilled water ... 900 parts
Solution E
  Esterified resin IV ... 100 parts
  distilled water ... 900 parts
  2-diethylaminoethanol ... sufficient to bring pH to 8.5–9.0
Solution F
  Esterified resin V ... 100 parts
  distilled water ... 900 parts
  2-diethylaminoethanol ... sufficient to bring pH to 8.5–9.0

TABLE VII

| Parts by weight: | | | | | | | | | |
| --- | --- | --- | --- | --- | --- | --- | --- | --- | --- |
| Modified resin III | 100 | 80 | 75 | 67 | 50 | 33 | 25 | 20 | 0 |
| Acrylate resin VIII | 0 | 20 | 25 | 33 | 50 | 67 | 75 | 80 | 100 |
| Curing time: | | | | | | | | | |
| 0.5 hour | Flexible, acetone soluble | Flexible, softened by acetone | Flexible, softened by acetone | Flexible, softened by acetone | Flexible, softened by acetone | Brittle, softened by acetone | Brittle, softened by acetone | Brittle, acetone soluble | Brittle, acetone soluble. |
| 1 hour | do | do | do | do | do | Flexible, softened by acetone | Flexible, softened by acetone | Flexible, acetone soluble | Do. |
| 2 hours | do | do | Flexible, slightly softened by acetone | Flexible, slightly softened by acetone | Flexible, slightly softened by acetone | do | do | do | Do. |

EXAMPLE 30

Two electrodes, each an abraded and degreased steel plate 10 cm.×5 cm., were suspended 2.5 cm. apart in the solutions described below and subjected to a potential difference of 14 volts (direct current). The coated anodes were removed, rinsed with distilled water, and stored at 190° C. for 1 hour.

The solutions used were:

In preparing solutions E and F, the distilled water was added in portions, with alternating additions of 2-diethylaminoethanol in quantities sufficient to prevent precipitation of the resin, the quantity of amine in the last addition being sufficient to bring the pH to the value shown.

Coatings approximately 0.02 mm. thick were applied electrophoretically to steel or aluminum plates at 60 volts, the time of deposition being 10 seconds. Unless stated otherwise, the coatings were cured at 150° C. for 30 minutes. Results obtained in various tests are shown in table IX.

TABLE IX

| Test | Coating from— | | |
|---|---|---|---|
| | Solution D | Solution E | Solution F |
| Colour: | | | |
| After normal curing | Good | Fair | Fair. |
| After curing at 150° C. for 120 minutes—resistance to overbaking. | do | Poor | Poor. |
| Cure: acetone test, 20 rubs | Satisfactory | Softened | Softened. |
| Stain resistance (contact time 5 days): | | | |
| Ketchup | do | Satisfactory | Satisfactory. |
| Mustard | do | do | Do. |
| Lipstick | do | Slight stain | Slight stain. |
| Ink | do | Satisfactory | Satisfactory. |
| Tomato juice | do | do | Do. |
| Tap water | No loss of gloss. | No loss of gloss. | No loss of gloss. |
| Chemical resistance: | | | |
| Boiling water—48 hours | Satisfactory | Satisfactory | Failed after 5 hours. |
| 20% sodium hydroxide solution—5 days. | do | do | Failed. |
| Ammonia solution, 0.88 S.G., diluted with 1.5 volumes water— | | | |
| 24 hours | do | do | Poor. |
| 5 days | do | do | Failed. |
| 50% sulphuric acid— | | | |
| 24 hours | do | do | Severe attack. |
| 5 days | Fair | Fair | Failed. |
| 10% acetic acid— | | | |
| 24 hours | Satisfactory | Satisfactory | Poor. |
| 5 days | Fair | Fair | Failed. |
| Industrial methylated spirits—5 days. | Satisfactory | Satisfactory | Satisfactory. |
| Xylene—5 days | do | do | Do. |
| Humidity test*—5 days | do | Slight corrosion. | Do. |
| Salt spray test*—5 days | do | Satisfactory | Slight corrosion. |

*British Ministry of Defence Specification DEF 1053.

The superior properties of the coating deposited from a composition of the present invention, particularly in chemical and stain resistance, and also tolerance to over-baking, are readily apparent.

We claim:

1. A curable composition of matter suitable for coating articles by electrophoretic deposition comprising:
   a. a reaction product formed by heating a liquid mixture of a dicarboxylic acid anhydride with an epoxide alcohol free from carboxyl groups, the anhydride being used in a quantity sufficient to supply from 0.4 to 1.3 anhydride group equivalents per hydroxyl group equivalent of the epoxide alcohol, so that at least 40 percent of the alcoholic hydroxyl group content of the epoxide alcohol is esterified by the dicarboxylic acid anhydride but not more than 25 percent of the 1,2-epoxide group content of the epoxide alcohol has reacted with the dicarboxylic acid anhydride,
   and, b. a base in quantity at least sufficient to neutralize the free carboxyl groups of component (a).

2. A curable composition of matter suitable for coating articles by electrophoretic deposition comprising:
   a. a reaction product formed by heating a liquid mixture of a dicarboxylic acid anhydride with an epoxide alcohol free from carboxyl groups, the anhydride being used in a quantity sufficient to supply from 0.4 to 1.3 anhydride group equivalents per hydroxyl group equivalent of the epoxide alcohol, so that at least 40 percent of the alcoholic hydroxyl group content of the epoxide alcohol is esterified by the dicarboxylic acid anhydride but not more than 25 percent of the 1,2-epoxide group -epoxide of the epoxide alcohol has reacted with the dicarboxylic acid anhydride;
   b. a base in quantity at least sufficient to neutralize the free carboxyl groups of component, and
   c. a curing agent for component (a), which is a member selected from the group consisting of polycarboxylic acid, polycarboxylic anhydride, melamine-formaldehyde resin, urea-formaldehyde resin, melamine-formaldehyde resin etherified with an aliphatic alcohol containing one to four carbon atoms, phenolformaldehyde resin, and acrylate resin containing free carboxyl groups.

3. A composition as claimed in claim 1 wherein the epoxide alcohol employed as starting material for preparing component (a) is free from esterified carboxyl groups.

4. A composition as claimed in claim 1 wherein component (a) is formed by heating the epoxide alcohol with the dicarboxylic acid anhydride in the absence of any added solvent and at a temperature in the range 60° to 150° C.

7. A composition as claimed in claim 6, wherein component (a) is formed by heating the epoxide alcohol and the dicarboxylic acid anhydride at a temperature in the range 80° to 130° C.

6. A composition as claimed in claim 1, wherein component (a) is formed by heating together the epoxide alcohol and dicarboxylic acid anhydride for at least 30 minutes.

7. A composition as claimed in claim 6, wherein component (a) is formed by heating together the epoxide alcohol and dicarboxylic acid anhydride for from 1 to 3 hours.

8. A composition as claimed in claim 1, wherein the epoxide alcohol used for the preparation of component (a) has a 1,2-epoxide content of at least 1.0 equivalent per kilogram.

9. A composition as claimed in claim 1, wherein the epoxide alcohol used for the preparation of component (a) contains no substituent groups, apart from 1,2-epoxide groups and alcoholic hydroxyl groups, capable of reaction with the dicarboxylic acid anhydride.

10. A composition as claimed in claim 1, wherein the epoxide alcohol used for the preparation of component (a) contains, per average molecule, more than one 1,2-epoxide group.

11. A composition as claimed in claim 1, wherein the dicarboxylic acid anhydride used for the preparation of component (a) contains no substituent groups, other than dicarboxylic acid anhydride groups, capable of reaction with 1,2-epoxide groups or alcoholic hydroxyl groups of the epoxide alcohol.

12. A composition as claimed in claim 1, wherein the alcoholic hydroxyl groups of the epoxide alcohol used for the preparation of component (a) are members selected from the group consisting of primary alcoholic hydroxyl groups and secondary alcoholic hydroxyl groups.

13. A composition as claimed in claim 1, wherein the epoxide alcohol used for the preparation of component (a) is of the formula $$CH_2-CHCH_2(O.Z.OCH_2CHOHCH_2)_qO.Z.OCH_2CH_2-CH_2$$

where Z denotes the group of formula $$-\langle\phantom{x}\rangle-\underset{CH_3}{\overset{CH_3}{C}}-\langle\phantom{x}\rangle-$$

and $q$ is a number having a value of at least one but not more than 10.

14. A composition as claimed in claim 1, wherein the dicarboxylic acid anhydride used for the preparation of component (a) is a member selected from the group consisting of tetrahydrophthalic anhydride and hexahydrophthalic anhydride.

15. A composition as claimed in claim 1, wherein the base (b) is an aqueous solution of a member selected from the group consisting of ammonia, sodium hydroxide and potassium hydroxide.

16. A composition as claimed in claim 2, wherein the curing agent (c) is a member selected from the group consisting of melamine-formaldehyde resin, urea-formaldehyde resin, melamine-formaldehyde resin etherified with an aliphatic alcohol containing one to four carbon atoms, urea-formaldehyde resin etherified with an aliphatic alcohol containing one to four carbon atoms, phenol-formaldehyde resin and acrylate resin containing free carboxyl groups.

CERTIFICATE OF CORRECTION

Patent No. 3,627,720    Dated December 14, 1971

Inventor(s) Hinton et al

It is certified that error appears in the above-identified patent and that said Letters Patent are hereby corrected as shown below:

Column 13, line 69, delete "-epoxide"(second occurrence); line 73, before "and" insert --- (a) ---.

Column 14, line 12, "7" should be --- 5 ---;  same line, "6" should be --- 4 ---;  line 49 should read:

Column 13, line 69, after "group" insert -- content --.

Signed and sealed this 18th day of July 1972.

(SEAL)
Attest:

EDWARD M. FLETCHER, JR.
Attesting Officer

ROBERT GOTTSCHALK
Commissioner of Patents